United States Patent
Bangolae et al.

(10) Patent No.: US 10,051,653 B2
(45) Date of Patent: Aug. 14, 2018

(54) TECHNIQUES AND SYSTEMS FOR EXTENDED DISCONTINUOUS RECEPTION

(71) Applicant: Intel IP Corporation, Santa Clara, CA (US)

(72) Inventors: Sangeetha Bangolae, Beaverton, OR (US); Marta Martinez Tarradell, Hillsboro, OR (US); Puneet Jain, Hillsboro, OR (US); Youn Hyoung Heo, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/141,541

(22) Filed: Apr. 28, 2016

(65) Prior Publication Data

US 2016/0249406 A1 Aug. 25, 2016

Related U.S. Application Data

(63) Continuation of application No. 14/125,871, filed as application No. PCT/US2013/057882 on Sep. 3, 2013, now Pat. No. 9,357,463.

(Continued)

(51) Int. Cl.
H04W 72/12 (2009.01)
H04W 16/32 (2009.01)
(Continued)

(52) U.S. Cl.
CPC .......... *H04W 72/1263* (2013.01); *H04J 3/00* (2013.01); *H04L 5/0096* (2013.01); *H04L 5/22* (2013.01);
(Continued)

(58) Field of Classification Search
CPC .............. H04W 76/048; H04W 68/02; H04W 72/1263; H04W 72/1278; Y02D 70/00
See application file for complete search history.

(56) References Cited

U.S. PATENT DOCUMENTS

2004/0185871 A1 9/2004 Somani et al.
2005/0135360 A1 6/2005 Shin et al.
(Continued)

FOREIGN PATENT DOCUMENTS

CN 101115239 1/2008
EP 1 962 520 8/2008
(Continued)

OTHER PUBLICATIONS

3GPP, "Technical Specification Group Services and System Aspects; Machine-Type and other Mobile Data Applications Communications Enhancements (Release 12)," 3GPP TR 23.887 V1.0.0 (Jun. 2013), Lte, 133 pages.

(Continued)

*Primary Examiner* — Rina C Pancholi
(74) *Attorney, Agent, or Firm* — Schwabe, Williamson & Wyatt, P.C.

(57) ABSTRACT

Embodiments of techniques and systems for extended discontinuous reception (DRX) are described herein. In some embodiments, a user equipment (UE) configured for extended DRX may include receiver circuitry and paging circuitry. The receiver circuitry may be configured to receive a system frame number from an eNB and receive extension data from the eNB. The paging circuitry may be configured to determine an augmented system frame number based on the system frame number and the extension data, determine a paging frame number based on the extension data, and monitor for paging occasions when the augmented system (Continued)

frame number is equal to the paging frame number. Other embodiments may be described and/or claimed.

11 Claims, 4 Drawing Sheets

Related U.S. Application Data

(60) Provisional application No. 61/753,914, filed on Jan. 17, 2013.

(51) Int. Cl.

| | | |
|---|---|---|
| *H04W 48/16* | (2009.01) | |
| *H04W 56/00* | (2009.01) | |
| *H04L 5/22* | (2006.01) | |
| *H04J 3/00* | (2006.01) | |
| *H04W 28/02* | (2009.01) | |
| *H04W 76/27* | (2018.01) | |
| *H04W 76/11* | (2018.01) | |
| *H04W 52/02* | (2009.01) | |
| *H04W 12/04* | (2009.01) | |
| *H04W 76/02* | (2009.01) | |
| *H04W 12/02* | (2009.01) | |
| *H04W 72/04* | (2009.01) | |
| *H04W 76/04* | (2009.01) | |
| *H04W 24/10* | (2009.01) | |
| *H04W 88/06* | (2009.01) | |
| *H04W 36/00* | (2009.01) | |
| *H04L 5/00* | (2006.01) | |
| *H04W 48/10* | (2009.01) | |
| *H04W 84/12* | (2009.01) | |

(52) U.S. Cl.
CPC .......... *H04W 12/02* (2013.01); *H04W 12/04* (2013.01); *H04W 16/32* (2013.01); *H04W 24/10* (2013.01); *H04W 28/0231* (2013.01); *H04W 36/0066* (2013.01); *H04W 48/10* (2013.01); *H04W 48/16* (2013.01); *H04W 52/0251* (2013.01); *H04W 56/001* (2013.01); *H04W 72/0413* (2013.01); *H04W 72/12* (2013.01); *H04W 72/1278* (2013.01); *H04W 76/021* (2013.01); *H04W 76/046* (2013.01); *H04W 76/11* (2018.02); *H04W 76/27* (2018.02); *H04W 88/06* (2013.01); *H04L 5/0092* (2013.01); *H04L 5/0094* (2013.01); *H04L 2209/80* (2013.01); *H04W 84/12* (2013.01); *Y02B 60/50* (2013.01); *Y02D 70/00* (2018.01)

(56) References Cited

U.S. PATENT DOCUMENTS

| | | | |
|---|---|---|---|
| 2005/0176474 A1* | 8/2005 | Lee .......................... | H04B 7/26 455/574 |
| 2006/0094415 A1 | 5/2006 | Veron | |
| 2008/0268878 A1 | 10/2008 | Wang et al. | |
| 2009/0129342 A1 | 5/2009 | Hwang et al. | |
| 2009/0268635 A1 | 10/2009 | Gallagher et al. | |
| 2009/0310503 A1* | 12/2009 | Tenny et al. .................. | 370/252 |
| 2010/0056175 A1 | 3/2010 | Bachmann et al. | |
| 2010/0130237 A1* | 5/2010 | Kitazoe ............... | H04W 76/048 455/458 |
| 2010/0172336 A1 | 7/2010 | Pehrsson et al. | |
| 2010/0184458 A1 | 7/2010 | Fodor et al. | |
| 2010/0203865 A1 | 8/2010 | Horn et al. | |
| 2010/0210269 A1 | 8/2010 | Shuai | |
| 2010/0279717 A1 | 11/2010 | Venkatachalam et al. | |
| 2011/0002267 A1 | 1/2011 | Dwyer et al. | |
| 2011/0170410 A1 | 7/2011 | Zhao et al. | |
| 2011/0195709 A1 | 8/2011 | Christensson et al. | |
| 2011/0217978 A1 | 9/2011 | Horn | |
| 2012/0033595 A1 | 2/2012 | Aoyama et al. | |
| 2012/0034898 A1 | 2/2012 | Tiwari | |
| 2012/0039313 A1 | 2/2012 | Jain | |
| 2012/0208545 A1 | 8/2012 | Yang et al. | |
| 2012/0300685 A1* | 11/2012 | Kim et al. ...................... | 370/311 |
| 2014/0112221 A1* | 4/2014 | Verger .............. | H04W 52/0216 370/311 |
| 2014/0204931 A1 | 7/2014 | Jain | |

FOREIGN PATENT DOCUMENTS

| | | |
|---|---|---|
| EP | 2111018 A1 | 10/2009 |
| EP | 2453710 A1 | 5/2012 |
| KR | 1020050063823 | 6/2005 |
| TW | 201230845 A | 7/2012 |
| TW | 201249230 A | 12/2012 |
| WO | 200178032 A1 | 10/2001 |
| WO | 2009/152367 A1 | 12/2009 |
| WO | 2012021359 A1 | 2/2012 |
| WO | 2012/135275 A3 | 10/2012 |

OTHER PUBLICATIONS

3GPP LTE Advanced, "Evolved Universal Terrestrial Radio Access (E-UTRA); User Equipment (UE) procedures in idle mode (3GPP TS 36.304 version 11.3.0 Release 11)," ETSI TS 136 304 V11.3.0 (Apr. 2013), 36 pages.

3GPP LTE Advanced, "Evolved Universal Terrestrial Radio Access (E-UTRA); Radio Resource Control (RRC); Protocol specification (3GPP TS 36.331 version 11.3.0 Release 11)," ETSI TS 136 331 V11.3.0 (Apr. 2013), 348 pages.

International Search Report and Written Opinion dated Dec. 12, 2013 from International Application No. PCT/US2013/057882.

Sharp, "Flexible DRX Control in LTE," 3GPP TSG-RAN WG2, R2-071247, Mar. 26-30, 2007, St Julian's, Malta.

International Preliminary Report on Patentability dated Jul. 30, 2015 from International Application No. PCT/US2013/057882.

Office Action dated Aug. 10, 2015 from Taiwan Patent Application No. 103100202.

Office Action issued by Chinese Patent Office for Patent Application No. 201310425578.7 dated Jun. 15, 2016; 19 pages.

3GPP TR 23.888V0.4.1(Jun. 2010); "Technical Specification Group Services and System Aspects; System Improvements for Machine-Type Communications; (Release 10)," 53 pages.

3GPP TR 23.888V0.5.1(Jul. 2010); "Technical Specification Group Services and System Aspects; System Improvements for Machine-Type Communications; (Release 10)," 75 pages.

Extended European Search Report dated Sep. 7, 2016 from European Patent Application No. 13871937.2, 9 pages.

"3rd Generation Partnership Project; Technical Specification Group Core Network and Terminals; Non-Access-Stratum (NAS) protocol for Evolved Packet System (EPS); Stage 3", 3GPP TS 24.301 V10.1.0, Release 10, Dec. 2010, 305 pages.

"3rd Generation Partnership Project; Technical Specification Group GSM/EDGE Radio Access Network; Mobile radio interface layer 3 specification; Radio Resource Control (RRC) protocol", 3GPP TS 44.018 V10.0.0, Release 10, Sep. 2010, 429 pages.

International Search Report and Written Opinion for PCT/US2011/046479, dated Jan. 11, 2012, 8 pages.

International Preliminary Report on Patentability for PCT/US2011/046479, dated Jan. 3, 2013, 6 pages.

Office Action for U.S. Appl. No. 12/975,827, dated Sep. 30, 2013, 44 pages.

Office Action for Chinese Patent Application Serial No. 201180046877.9, dated May 10, 2016, 8 pages (Including 5 page of English translation.)

3GPP TR 23.887 V12.0.0 (Dec. 2013); Technical Specification Group Services and System Aspects; Study on Machine-Type Communications (MTC) and other mobile data applications communications enhancements (Release 12); 151 pages.

(56) References Cited

OTHER PUBLICATIONS

Office Action dated Jan. 11, 2016 from U.S. Appl. No. 14/219,240, 18 pages.
Final Office Action dated Jun. 30, 2016 from U.S. Appl. No. 14/219,240, 20 pages.
Office Action dated Dec. 6, 2016 from U.S. Appl. No. 14/219,240, 21 pages.
Extended European Search Report for European Patent Application No. 14152851.3, dated Dec. 1, 2014, 7 pages.
Extended European Search Report for European Patent Application No. 11816831.9, dated Aug. 21, 2014, 7 pages.
Extended European Search Report for European Patent Application No. 14152802.6, dated Aug. 21, 2014, 7 pages.
3GPP TS 24.008 V9.3.0 (Jun. 2010), 3rd Generation Partnership Project; Technical Specification Group Core Network and Terminals, Mobile radio interface Layer 3 specification, Core network protocols, Stage 3, Release 9, Jun. 14, 2010, 611 pages.
Intel, "Periodic LAU/RAU/TAU Optimizations for Signaling Congestion Control", 3GPP TSG SA WG2 Meeting #79E (Electronic), Jul. 6-13, 2010, Elbonia, TD S2-103223, XP50458293, 4 pages.
Office Action for Chinese Patent Application No. 201180046877.9 dated Feb. 4, 2015, 17 pages of which 10 are an English translation.
3GPP TS 24.008 V9.3.0, 3rd Generation Partnership Project; Technical Specification Group Core Network and Terminals; Mobile radio interface Layer 3 specification; Core network protocols; Stage 3 (Release 9), Jun. 30, 2010, Section 4.7.2, Section 4.7.5.1.6, Section 4.7.5.2, 7 pages.
Office Action for Chinese Patent Application 201180046877.9, dated Nov. 18, 2015, 23 pages (including 13 pages of English translation).
Office Action for Chinese Patent Application 201310425578.7, dated Oct. 21, 2015, 21 pages (including 14 pages of English translation).
"Extended Tracking Area Update Timer", 3GPP TSG_CT WG1 Meeting #67, C1-104431, Current version 10.0.0, Revision 2, Oct. 11-15, 2010, 10 pages.
"3rd Generation Partnership Project; Technical Specification Group Services and System Aspects; General Packet Radio Service (GPRS) enhancements for Evolved Universal Terrestrial Radio Access Network (E-UTRAN) access", 3GPP TS 23.401 V10.1.0, Release 10, Sep. 2010, 271 pages.
"3rd Generation Partnership Project; Technical Specification Group Services and System Aspects; General Packet Radio Service (GPRS); Service description; Stage 2", 3GPP TS 23.060 V10.1.0, Release 10, Sep. 2010, 310 pages.
"3rd Generation Partnership Project; Technical Specification Group Core Network and Terminals; Mobile radio interface Layer 3 specification; Core network protocols; Stage 3", 3GPP TS 24.008 V10.0.0, Release 10, Sep. 2010, 617 pages.
"Section 5.3.4 Handling of the periodic tracking area update timer and mobile reachable timer (S1 mode only)", 3GPP TS 24.301 V8.0.0, Release 8, Dec. 2008, p. 38.
"Section 5.3A Handling of timer T3402", 3GPP TS 24.301 V8.0.0, Release 8, Dec. 2008, p. 39.
Article 94 issued Apr. 11, 2017 from European Divisional Application No. 14152802.6, 4 pages.
Intel, "Periodic LAU/RAU/TAU Optimizations for Signalling Congestion Control," 3GPP TSG SA WG2 Meeting #79E (Electronic), TD S2-103150, Agenda Item: 2.2, Jul. 6-13, 2010, Elbonia, 2 pages.

\* cited by examiner

TECHNIQUES AND SYSTEMS FOR EXTENDED DISCONTINUOUS RECEPTION

CROSS-REFERENCE TO RELATED APPLICATIONS

The present application is a continuation of U.S. patent application Ser. No. 14/125,871, filed Sep. 3, 2013, entitled "TECHNIQUES AND SYSTEMS FOR EXTENDED DISCONTINUOUS RECEPTION," which is national phase entry under 35 U.S.C. § 371 of International Application No. PCT/US2013/057882, filed Sep. 3, 2013, entitled "TECHNIQUES AND SYSTEMS FOR EXTENDED DISCONTINUOUS RECEPTION," which designates the United States of America, and which claims priority to U.S. Provisional Application No. 61/753,914, filed Jan. 17, 2013, entitled "Advanced Wireless Communication Systems and Techniques," the entire disclosure of which is hereby incorporated by reference in its entirety.

FIELD

Embodiments of the present disclosure generally relate to the field of wireless communication systems, and more particularly, to techniques and systems for extended discontinuous reception.

BACKGROUND

In some applications, wired or wireless user equipment (UE) may wish to transmit small amounts of data periodically or aperiodically with little or no human intervention. Such transmissions may be "mobile originated" and/or "mobile terminated," and may be referred to as "machine type communications" (MTCs). MTC applications are often characterized as nomadic, distributed, and low mobility. For example, a UE configured for MTC may include a power meter or other sensor that collects information, and may relay this information through a network (e.g., wireless, wired, or hybrid) to an application that translates the information into meaningful data.

In some communication protocols, a UE will utilize a discontinuous reception (DRX) strategy to minimize power consumption. In such a strategy, the UE will spend some of its lifetime in a sleep phase, and awaken at periodic "paging occasions" to determine whether there is any information for the equipment to receive or for it to transmit. Current technology imposes a low upper limit on the interval between paging occasions (referred to as the duration of the paging or DRX cycle). Although existing DRX strategies may be sufficient for typical cellular phone and mobile computing applications (in which the user equipment may be easily recharged), a UE configured for MTC may have limited or no ability to recharge its onboard power supply during the device's lifetime.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
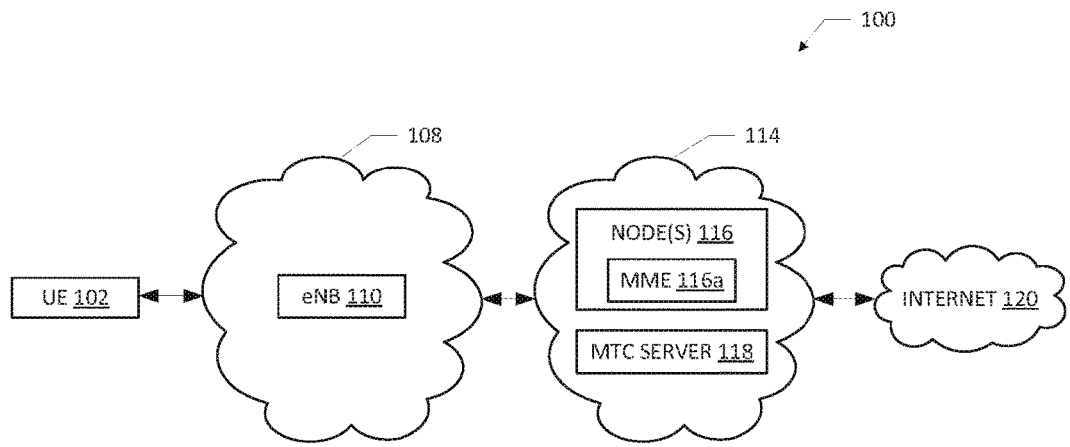
FIG. 1 illustrates an example wireless communication network, in accordance with some embodiments.

Embodiments of techniques and systems for extended discontinuous reception (DRX) are described herein. In some embodiments, a user equipment (UE) configured for extended DRX may include receiver circuitry and paging circuitry. The receiver circuitry may be configured to receive a system frame number from an eNB and receive extension data from the eNB. The paging circuitry may be configured to determine an augmented system frame number based on the system frame number and the extension data, determine a paging frame number based on the extension data, and monitor for paging occasions when the augmented system frame number is equal to the paging frame number. Other embodiments may be described and/or claimed.

The DRX paging techniques described herein may advantageously allow UEs running MTC and other applications to operate within an existing wireless communication network while extending their effective lifetime by reducing the amount of energy wasted in powering receiver circuitry unnecessarily. In existing DRX techniques, user equipment must power its receiver circuitry and monitor for a paging message from a base station every time the SFN is equal to a predetermined value or set of values. Since the SFN has a fixed number of bits, the SFN value will reset once its maximum value is reached; thus, the maximum value of the SFN dictates the maximum time interval that may elapse between scheduled events. For example, if the SFN is ten bits long and a UE is configured to transition from a sleep phase to a listening phase when the SFN is equal to a particular ten-bit value, the maximum interval between two such transitions (i.e., the maximum possible DRX cycle) is $2^{10}$ increments (equal to 10.24 seconds if the SFN is incremented every 10 milliseconds). In typical mobile device applications, responsiveness and speed are prioritized over power savings, and thus it is advantageous to supply power to the receiver circuitry often in order to adequately monitor DL signaling (e.g., to quickly receive and respond to UL grants or DL data transmissions); consequently, existing maximum DRX cycle lengths may be sufficient.

However, the performance of UEs may be optimized when paging occasions occur less frequently (i.e., when the DRX cycle is longer), especially when the UE is configured for MTC applications. Responding to each paging occasion in existing DRX strategies, even with the longest possible DRX cycle, will excessively tax a UE's power supply, thereby limiting the device's ability to execute longer-term or more data-intensive MTC applications.

Moreover, since the SFN is used as a basic timing reference for many wireless communication operations apart from DRX-related operations, simply increasing the number of bits allocated to the SFN may disrupt other existing devices and techniques. The techniques disclosed herein may allow various components of a wireless network to effectively "extend" the range of SFN values, thereby extending the achievable length of a DRX cycle and reducing power consumption in MTC and other applications, without compromising the performance of existing devices. Various embodiments disclosed herein may allow the length of DRX cycles to be tailored to particular user equipment for MTC or other applications, and for the length of these cycles to extend to minutes, hours or days.

In the following detailed description, reference is made to the accompanying drawings which form a part hereof, wherein like numerals designate like parts throughout, and in which are illustrated embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry," "logic" or "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks operating in conformance with one or more protocols specified by the 3rd Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The embodiments disclosed herein may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example wireless communication network 100 in accordance with some embodiments. The network 100 may include one or more radio access networks (hereinafter "RAN 108") and a core network 114. In some embodiments, the network 100 may be an Internet Protocol (IP) based network. For example, the core network 114 may be an IP based network. Interfaces between network nodes (e.g., the one or more nodes 116) may be based on IP, including a backhaul connection to the eNB 110. In some embodiments, the network 100 includes a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, the RAN 108 may include GSM EDGE Radio Access Network (GERAN) where EDGE stands for Enhanced Data for GSM Evolution, Universal Terrestrial Radio Access Network (UTRAN), or Evolved UTRAN (E-UTRAN). The network 100 may operate in accordance with other network technologies in other embodiments.

For ease of illustration, the following description is provided for an example network 100 that conforms with 3GPP; however, the subject matter of the present disclosure is not limited in this regard and the embodiments disclosed herein may be advantageously applied to other wired or wireless communication protocols or networks. For example, in an embodiment in which the RAN 108 is a UTRAN, the eNB 110 (discussed in additional detail below) may take the form of a Radio Network Controller (RNC), which is configured to communicate with the UE 102 (discussed in additional detail below). In an embodiment where the RAN 108 is a GERAN, the eNB 110 may represent an eNB controller (BSC) configured to communicate with the UE 102 via a base transmission station (BTS).

As shown in FIG. 1, a UE 102 may access the core network 114 via a radio link ("link") with an eNB 110 (also commonly denoted as an evolved Node B, enhanced Node B, or eNode B in 3GPP LTE) in the RAN 108. A downlink (DL) transmission may be a communication from the eNB 110 to the UE 102, and an uplink (UL) transmission may be a communication from the UE 102 to the eNB 110. A single UE and a single eNB are illustrated in FIG. 1 for ease of illustration; the network 100 may include any number of UEs and eNBs while practicing suitable embodiments of the present disclosure.

In some embodiments, the UE 102 may be a mobile communication device, a subscriber station, or another device that is configured to communicate with the eNB 110 in conformance with an appropriate protocol (e.g., a multiple-input/multiple-output (MIMO) communication scheme). As discussed in further detail below, the UE 102 may be configured for extended DRX cycles.

In some embodiments, the UE 102 may be configured to communicate with another machine using machine type communication (MTC). The term "MTC," as discussed above, refers to data transmitted or from user equipment to another machine with the need for little or no human interaction. For example, the UE 102 may be as simple as a sensor that is electrically coupled to a wireless transceiver (e.g., the receiver circuitry 202 and the transmitter circuitry 208, discussed below with reference to FIG. 2), and may be configured to communicate, with little or no intervention, with an MTC server 118. The wireless transceiver of the UE 102 may be configured to communicate with at least one of a WPAN, WLAN, and WWAN. In some embodiments (and as discussed in additional detail below), the UE 102 may include one or more antennas used to concurrently utilize radio resources of multiple respective component carriers (e.g., which may correspond with antennas of the eNB 110) of the network 100. For example, the UE 102 may be configured to communicate using Orthogonal Frequency Division Multiple Access (OFDMA) (in, e.g., downlink communications) and/or Single-Carrier Frequency Division Multiple Access (SC-FDMA) (in, e.g., uplink communications).

In various embodiments the UE 102 may be, may include, or may be included in a single sensor device, a cellular telephone, a personal computer (PC), a notebook, ultrabook, netbook, smart phone, an ultra mobile PC (UMPC), a handheld mobile device, an universal integrated circuit card (UICC), a personal digital assistant (PDA), a Customer Premise Equipment (CPE), a tablet computing device, or other consumer electronics such as MP3 players, digital cameras, and the like. The UE can include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (under development), or some other revision or release of the 3GPP LTE standards. The term "MTC," as used herein, is also considered to be inclusive of and synonymous with the term "machine to machine" (M2M). In some embodiments, the UE 102 may represent a group of multiple wireless devices that are configured to establish communication with the MTC server 118 in response to receiving a triggering indication from the server via the eNB 110 of the RAN 108. Various embodiments of the UE 102 are described below with reference to FIG. 2.

In some embodiments, the eNB 110 may include one or more antennas, one or more radio modules to modulate and/or demodulate signals transmitted or received on an air interface, and one or more digital modules to process signals transmitted and received on the air interface. The eNB 110 may be configured to support extended DRX cycles, as disclosed herein. Various embodiments of the eNB 110, as configured to enable MTC, are described below with reference to FIG. 3.

In some embodiments, communication with the UE 102 via the RAN 108 may be facilitated via one or more nodes 116. The one or more nodes 116 may serve as an interface between the core network 114 and the RAN 108. According to various embodiments, the one or more nodes 116 may include a Mobile Management Entity (MME) 116*a* that is configured to manage signaling exchanges (e.g., authentication of the UE 102) between the eNB 110 and the core network 114 (e.g., the MTC server 118). In some embodiments, the MME 116*a* may be responsible for tracking and paging user equipment (e.g., the UE 102) when the user equipment is in an idle mode (discussed below with reference to FIG. 2). The one or more nodes 116 may include other components, such as a Packet Data Network Gateway (PGW, not shown) to provide a gateway router to the Internet 120, and/or a Serving Gateway (SGW) to manage user data tunnels or paths between the eNB 110 and the PGW, for example.

The core network 114 may include circuitry to provide authentication of the UE 102 or other actions associated with establishment of a communication link to establish a connected mode of the UE 102 with the network 100. The core network 114 may include the MTC server 118 that may be communicatively coupled to the eNB 110. In some embodiments, the core network 114 may include other servers.

Figure 2:
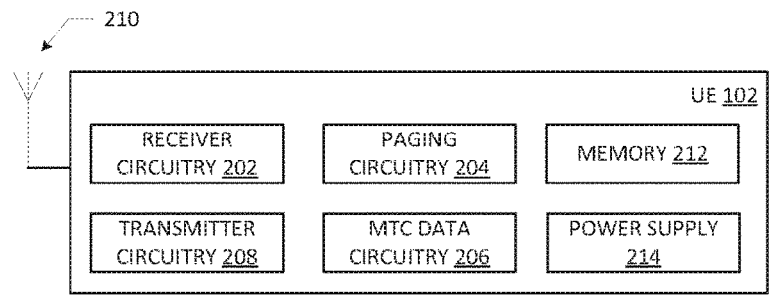
FIG. 2 is a block diagram of an illustrative user equipment (UE) configured for extended discontinuous reception (DRX) cycles, in accordance with some embodiments.

Referring now to FIG. 2, a block diagram of an embodiment of the UE 102 is illustrated. As discussed above, the UE 102 may be configured for extended DRX cycles. The UE 102 may include, or be included in, a mobile wireless device, such as a PDA, cellular telephone, tablet computer or laptop computer, or other sensor or metering device. Any of the components of the UE 102 may be electrically, physically and/or communicatively coupled together to perform the operations described herein.

The UE 102 may include power supply circuitry 214. The power supply circuitry 214 may be coupled with any one or more components of the UE 102 (e.g., the receiver circuitry 202, the transmitter circuitry 208, and the paging circuitry 204). In some embodiments, the power supply circuitry 214 may include one or more batteries, cells, switches, voltage controllers, current controllers or other control devices that may be used to increase, decrease or otherwise control power supplied to the various components of the UE 102. For example, when the UE 102 enters a "sleep" DRX phase (discussed below), the power supply circuitry 214 may reduce the amount of power supplied to the receiver circuitry 202 and/or other components of the UE 102.

The UE 102 may include an antenna 210. The antenna 210 may include one or more directional or omni-directional antennas such as dipole antennas, monopole antennas, patch antennas, loop antennas, microstrip antennas, and/or other types of antennas suitable for reception of radio frequency (RF) or other wireless communication signals. Although FIG. 2 depicts a single antenna, the UE 102 may include additional antennas.

The UE 102 may include receiver circuitry 202. The antenna 210 may be coupled to the receiver circuitry 202. The receiver circuitry 202 may be configured for receiving wireless signals, via the antenna 210, from other devices, such as any of the devices discussed above with reference to FIG. 1. For example, the receiver circuitry 202 may be configured to receive wireless signals from an eNB (such as the eNB 110) conveying paging data for MTC. Data received by the receiver circuitry 202 may be temporarily or permanently stored in the memory 212. The memory 212 may include any suitable memory device(s) and supporting circuitry, such as the memory devices discussed below with reference to FIG. 6.

In some embodiments, the receiver circuitry 202 may receive a system frame number (SFN) from the eNB 110. The SFN may act as a timing reference for synchronizing communications between the UE 102 and other components of the network 100. In 3GPP LTE, data transmissions may be organized into radio frames, having a duration of 10 milliseconds and divided into ten subframes of duration 1 millisecond, and the SFN may identify the radio frame currently transmitted. The SFN may be transmitted to the UE 102 from the eNB 110 in a master information block (MIB), which may provide the SFN and other information which allows the UE 102 to gain access to the network 100. In some embodiments, the UE 102 may receive an MIB from the eNB 110 at regular intervals (e.g., every 10 milliseconds), and each MIB may include an SFN. The MIB may be transmitted to the UE 102 on a broadcast channel of the cell of the UE 102.

In general, the SFN value included in an MIB will increment periodically, but in some embodiments, the same SFN may be transmitted in multiple sequential MIBs. In noise environments, this repetition may allow the UE 102 to detect and correct errors in the transmission of the MIB. In such embodiments, the UE 102 may maintain one or more additional counter bits that may be used to supplement the SFN value received from the eNB 110 to increment the SFN internally to the UE 102 while receiving the same SFN value from the eNB 110. For example, the eNB 110 may be configured to transmit the same SFN value in each of four sequential MIBs (which, when MIBs are transmitted every 10 milliseconds, will result in an incremented SFN value every 40 milliseconds). In order to increment the internal SFN value within that 40 millisecond interval, the UE 102 may maintain a two-bit counter (e.g., in the memory 212), which it will append to the latest SFN value from the eNB 110 (i.e., providing the two least significant bits). These two bits may be acquired during physical broadcast channel decoding, and may be incremented every time an MIB is received via the receiver circuitry 202. These additional two bits will allow the UE 102 to continue to count while the eNB 110 sends the four identical SFN values, effectively extending the range of the SFN without requiring additional bits to be transmitted from the eNB 110 in the MIB.

In some embodiments, the receiver circuitry 202 may receive extension data from the eNB 110. As used herein, "extension data" refers to data that indicates to the UE 102 that the SFN received from the eNB 110 should be augmented to form an augmented SFN (ASFN), and that ASFN should be used for paging timing. Extension data may be transmitted to the UE 102 in any of a number of ways. In some embodiments, the extension data is received from the eNB 110 in an information element of an MIB or a system information block (SIB). Table 1 depicts an MIB configuration in which extension data takes the form of an information element systemFrameNumber-Config, which can be set to "normal" (indicating that the SFN need not be augmented for paging purposes) or "extended" (indicating that the UE 102 should determine an ASFN to be used for paging purposes).

TABLE 1

Example MIB including extension data as an information element.

```
-- ASN1START
MasterInformationBlock : : =    SEQUENCE {
    dl-Bandwidth                ENUMERATED {
                                    n6, n15, n25, n50, n75, n100},
    phich-Config                PHICH-Config,
    systemFrameNumber-Config    ENUMERATED (normal, extended),
    systemFrameNumber           BIT STRING (SIZE (8)),
    spare                       BIT STRING (SIZE (9))
}
-- ASN1STOP
```

In some embodiments, extension data may be communicated to the UE 102 in a form other than an information element in an MIB or an SIB, such as using another message exchange.

Extension data received by the receiver circuitry 202 may specify how the UE 102 is to augment the SFN if an ASFN is to be used for DRX paging. In some embodiments, the MIB may include an information element systemFrameNumberExt, which may provide additional bits that can serve as the most significant bits of the ASFN created by concatenating the systemFrameNumberExt and the systemFrameNumber. Table 2 depicts an MIB configuration in which the systemFrameNumberExt adds ten additional most significant bits to the eight systemFrameNumber bits. When the UE 102 determines the ASFN by combining these eighteen bits with the two additional bits resulting from the decoding of the physical broadcast channel (as discussed above), the resulting ASFN will have a length of 20 bits. If the SFN is incremented every ten milliseconds, the use of a 20-bit ASFN may extending the maximum possible DRX cycle to approximately 2.9 hours. Although a ten-bit extension to the SFN is illustrated in Table 2, any number of bits may be added to the existing SFN to form the ASFN, and not all bits allocated to the extension of an SFN need be used.

TABLE 2

Example MIB including extension data as an information element.

```
-- ASN1START
MasterInformationBlock : : =    SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),
    systemFrameNumberExt        BIT STRING (SIZE (10))
}
-- ASN1STOP
```

In another embodiment, the UE 102 may be configured to use the information element systemFrameNumberMult illustrated in Table 2 above to extend the SFN by multiplying systemFrameNumberMult by systemFrameNumber to form the ASFN. In some such embodiments, the value of systemFrameNumberMult may be fixed, and may represent a multiplier factor used to specify how many complete runs through the full range of SFN values should elapse before the UE 102 should begin monitoring for a paging message.

TABLE 3

Example MIB including extension data as an information element.

```
-- ASN1START
MasterInformationBlock : : =    SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),
    systemFrameNumberMult       BIT STRING (SIZE (10))
}
-- ASN1STOP
```

In some embodiments, the number of extension bits (e.g., as illustrated in Table 2) or the multiplier factor (e.g., as illustrated in Table 3) may be determined by the eNB 110 or other device included in the network 100. For example, the extension data may be pre-configured as part of the subscription parameters for access to the network 100. In other embodiments, the UE 102 may propose a number of additional bits, a multiplier factor or other extension data, as discussed below.

In some embodiments, the receiver circuitry 202 may receive extension data that separately indicates that an ASFN should be calculated (e.g., as illustrated by the systemFrameNumber-Config information element of Table 1) and provides information regarding how the ASFN should be calculated (e.g., as illustrated by the systemFrameNumberExt information element of Table 2). In other embodiments, only one or more of these types of data may be included in the extension data transmitted to the UE 102.

The UE 102 may include paging circuitry 204. The paging circuitry 204 may be configured to allow the UE 102 to negotiate phases of operation in which data transfer may occur (referred to as "listening" phases) and phases of operation in which no data transfer occurs (referred to as "sleep" phases) and in which the receiver circuitry 202 is in a low-power or powered-off state. In some embodiments, the power supply circuitry 214 and the receiver circuitry 202 may be configured to disable wireless reception when the UE 102 is not monitoring for paging messages (e.g., during a sleep phase).

The paging circuitry 204 may transition the UE 102 from a sleep phase to a listening phase at predetermined paging occasions, based on the ASFN, in order to monitor for paging messages from the eNB 110 and to transmit any data (e.g., MTC data from the MTC data circuitry 206) that has been queued or is otherwise available for transmission. A paging occasion may be a frame or subframe in which the eNB 110 may transmit a paging message to the UE 102 on a paging channel. A radio frame may include one or more paging occasions. Paging messages may communicate any of a number of different kinds of data; for example, the eNB 110 may transmit a paging message to the UE 102 to notify the UE 102 of a system information change.

The particular DRX techniques implemented by the paging circuitry 204 may vary depending upon whether the UE 102 is in a connected mode or an idle mode. To determine whether the UE is in an idle mode or a connected mode, the paging circuitry 204 may maintain and/or access the values of one or more status variables in the memory 212. Status variables may represent information about the state of operation of the UE 102. For example, the paging circuitry 204 may access a status variable in the memory 212 that indicates whether the UE 102 is in a connected mode or an idle mode. The paging circuitry 204 may maintain and/or access different parameter values in the memory 212 that correspond to DRX operations to be performed in various modes.

The UE 102 may be in an idle mode when no RRC connection has been established between the UE 102 and an eNB. In the idle mode, the UE 102 may monitor a paging channel for paging messages from an eNB, in accordance with an idle-mode DRX technique. Examples of idle-mode DRX techniques include any of the DRX techniques disclosed herein, including using extension data and an SFN to generate an ASFN for use in monitoring for paging messages.

The UE 102 may be in a connected mode when a radio resource control (RRC) connection has been established between the UE 102 and the eNB 110. In the connected mode, the UE 102 may monitor a paging channel for paging messages from the eNB 110, in accordance with a connected-mode DRX technique (examples of which are discussed in detail herein). In connected mode, DRX cycles may be shorter than in an idle mode, since the UE 102 may need to remain synchronized with the eNB 110 in order to maintain data communications. In some embodiments, connected-mode DRX techniques may include a short DRX cycle that operates along with a long DRX cycle.

When performing DRX operations while the UE 102 is in a connected mode, the paging circuitry may access one or more connected mode DRX parameters stored in the memory 212. Examples of connected mode DRX parameters may include an on duration timer parameter, an inactivity timer parameter, a retransmission timer parameter, a long cycle start offset parameter, and/or a short cycle timer parameter. An on duration timer parameter may specify the duration of a listening phase within a DRX cycle. An inactivity timer parameter may specify how long the UE 102 should remain in a listening phase after the last activity detected on a physical downlink control channel. A retransmission timer parameter may specify the maximum number of subframes through which the UE 102 should continue to listen for incoming retransmissions on a physical downlink control channel after the first available retransmission time. A long cycle start offset parameter may specify the length of a long DRX cycle. In embodiments in which a short DRX cycle is configured to run within a long DRX cycle, t short cycle timer parameter may specify the number of subframes in which the UE 102 should remain in a listening phase after an inactivity timer period has expired.

In some embodiments of connected-mode DRX techniques, a multiplier factor drx-ExtendedFactor may be defined. Table 4 illustrates a multiplier factor drx-ExtendedFactor which can be specified as any of a range of integer values between a minimum and a maximum value. Table 5 illustrates a multiplier factor drx-ExtendedFactor which can be specified as any value of a list of possible values.

TABLE 4

Embodiment of a multiplier factor for use in connected-mode DRX techniques.

| | |
|---|---|
| DRX-Config-v12x0 : : = | SEQUENCE { |
| drx-ExtendedFactor-v12x0 | INTEGER (1 . . xx)    --Need OR |
| } | OPTIONAL, |

TABLE 5

Embodiment of a multiplier factor for use in connected-mode DRX techniques.

| | |
|---|---|
| DRX-Config-v12x0 : : = | SEQUENCE { |
| drx-ExtendedFactor | ENUMERATED (1, 2, .. ., xx)  --Need OR |
| } | OPTIONAL, |

A multiplier factor drx-ExtendedFactor may be used in any of a number of different ways to extend existing connected-mode DRX parameters to allow for longer DRX cycles. In some embodiments, all DRX parameters may be multiplied by the multiplier factor (e.g., all of the connected-mode parameters stored in the memory 212 and discussed above). In some embodiments, only parameters related to a long DRX cycle may be multiplied by the multiplier factor, and the remaining parameters may be unmodified. In some embodiments, some of the DRX parameters may be multiplied by this factor, while the rest of the parameters remain unmodified.

In some embodiments, the UE 102 (e.g., the paging circuitry 204, discussed below) may be configured to automatically apply a multiplier factor included in the extension data to the maximum possible length of a long DRX cycle, without the eNB 110 having to specify the length of the long DRX cycle to the UE 102. For example, if the maximum possible length of a long DRX cycle was 2560 and a multiplier factor of ten were transmitted to the receiver circuitry 202 of the UE 102, the UE 102 would implement a long DRX cycle having an extended length of 25,600. In some embodiments of connected-mode DRX, the receiver circuitry 202 may receive an indicator of a long DRX cycle length selected from a set of extended long DRX cycle lengths. Table 6 illustrates example long DRX cycle length values for the parameter extendedlongDRX-CycleStartOffset, each of which may extend the long DRX cycle in connected mode beyond currently available cycle lengths.

TABLE 6

Embodiment of extended long DRX cycles for connected-mode DRX techniques.

| | |
|---|---|
| DRX-Config-v12x0 ::= | SEQUENCE { |
| extendedlongDRX-CycleStartOffset | CHOICE { |
| sf5120 | INTEGER (0..5119), |
| sf10240 | INTEGER (0..10239), |
| ... | ..., |

TABLE 6-continued

Embodiment of extended long DRX cycles for connected-mode DRX techniques.

| | |
|---|---|
| sf8640000 | INTEGER (0..8659999), |
| ... | ..., |
| sfyy | INTEGER (0..yy), |
| ... | |
| } | |
| } | |

In some embodiments, connected-mode DRX parameters may be transmitted to the UE 102 as part of a medium access control (MAC) main configuration information element. Table 7 illustrates an example of such an embodiment, which includes the extendedlongDRX-CycleStartOffset parameter discussed above with reference to Table 6. Additional parameters may be included in any such information element to extend the duration of other DRX-related quantities, such as the on duration timer and the inactivity timer, discussed above.

TABLE 7

Embodiment of information element for use in connected-mode DRX techniques.

```
-- ASN1 START
MAC-MainConfig ::=                              SEQUENCE {
    ul-SCH-Config                               SEQUENCE {
        ... ...
                                                             OPTIONAL,    -- Need ON
    }
    drx-Config                                  DRX-Config    OPTIONAL,    -- Need ON
    ... .
    [[
        ... .
        drx-Config-v11x0                        DRX-Config-v11x0    OPTIONAL    -- Cond DRX
    ]]
    [[
        drx-Config-v12x0                        DRX-Config-v12-0    OPTIONAL    -- Cond DRX
    ]]
}
DRX-Config ::=        CHOICE {
    release                                     NULL,
    setup                                       SEQUENCE {
        onDurationTimer                             ENUMERATED {
                                                        psf1, psf2, psf3, psf4, psf5, psf6,
                                                        psf8, psf10, psf20, psf30, psf40,
                                                            psf50, psf60, psf80, psf100,
                                                        psf200},
        drx-InactivityTimer                         ENUMERATED {
                                                        psf1, psf2, psf3, psf4, psf5, psf6,
                                                        psf8, psf10, psf20, psf30, psf40,
                                                        psf50, psf60, psf80, psf100,
                                                        psf200, psf300, psf500, psf750,
                                                        psf1280, psf1920, psf2560, psf0-v1020,
                                                        spare9, spare8, spare7, spare6,
                                                        spare5, spare4, spare3, spare2,
                                                        spare1),
        drx-RetransmissionTimer                     ENUMERAGED {
                                                        psf1, psf2, psf4, psf6, psf8, psf16,
                                                        psf24, psf33},
        longDRX-CycleStartOffset                    CHOICE {
            sf10                                        INTEGER (0..9),
            sf20                                        INTEGER (0..19),
            sf32                                        INTEGER (0..31),
            sf40                                        INTEGER (0..39),
            sf64                                        INTEGER (0..63),
            sf80                                        INTEGER (0..79),
            sf128                                       INTEGER (0..127),
            sf160                                       INTEGER (0..159),
            sf256                                       INTEGER (0..255),
            sf320                                       INTEGER (0..319),
            sf512                                       INTEGER (0..511),
            sf640                                       INTEGER (0..639),
            sf1024                                      INTEGER (0..1023),
            sf1280                                      INTEGER (0..1279),
            sf2048                                      INTEGER (0..2047),
            sf2560                                      INTEGER (0..2559),
```

TABLE 7-continued

Embodiment of information element for use in connected-mode DRX techniques.

```
        },
        extendedlongDRX-CycleStartOffset            CHOICE {
                sf5120          INTEGER (0. .5119),
                sf10240         INTEGER (0. .10239),
        ...,            ...,
                sf8640000       INTEGER (0. .8659999),
        ...,            ...,
                sfyy            INTEGER (0. .yy),
        ...
        }
        shortDRX                                    SEQUENCE {
                shortDRX-Cycle                      ENUMERATED {
                                                        sf2, sf5, sf8, sf10, sf16, sf20,
                                                        sf32, sf40, sf64, sf80, sf128, sf160,
                                                        sf256, sf320, sf512, sf6401},
                drxShortCycleTimer                  INTEGER (1. .16)
        }       OPTIONAL                                                            -- Need OR
    }
}
DRX-Config-v11x0 ::=        SEQUENCE {
    drx-RetransmissionTimer-v11x0       ENUMERATED {psf0-v11x0) OPTIONAL, --Need OR
    longDRX-CycleStartOffset-v11x0      CHOICE {
        sf60-v11x0
        sf70-v11x0                                      INTEGER (0. .59),
    }                                                   INTEGER (0. .69)
    shortDRX-Cycle-v11x0                                                OPTIONAL --Need OR
}                                       ENUMERATED (sf4-v11x0)  OPTIONAL, --Need OR
--ASN1STOP
```

The paging circuitry 204 may be configured to store and modify any status variables or parameters for use in performing DRX-related operations. For example, in some embodiments, when the UE 102 is in a connected mode, the paging circuitry 204 may be configured to modify a connected mode DRX parameter stored in the memory 212 (such as any of the parameters described above) by multiplying the parameter by a multiplier factor included in the extension data received from the eNB 110, storing the modified parameter in the memory 212, and utilizing the modified parameter when performing DRX operations.

The paging circuitry 204 may communicate with the receiver circuitry 202 to access the extension data and the SFN, and may determine the ASFN based on the received extension data and the SFN. The paging circuitry 204 may store the ASFN in the memory 212. The paging circuitry 204 may also determine a paging frame number (PFN) for the UE 102 based on the extension data, and may monitor for paging occasions when the ASFN is equal to the PFN. The paging circuitry 204 may store the PFN in the memory 212.

Several techniques for determining and using ASFNs and PFNs are disclosed herein. For example, in some embodiments, the paging circuitry 204 may determine an ASFN by concatenating the received SFN and the extension data into a single bit string, representative of the ASFN. Examples of such embodiments are discussed above with reference to Table 2. If the SFN has a first fixed number of bits (e.g., ten), and the extension data has a second fixed number of bits (e.g., one or more), the resulting ASFN will have a total number of bits equal to the sum of the first and second numbers.

In another example, in some embodiments, the extension data may include a multiplier factor, and the paging circuitry 204 may determine an ASFN by multiplying the received SFN by the multiplier factor. Examples of such embodiments are discussed above with reference to Table 3.

The paging circuitry 204 may use any of a number of conventional techniques to determine which PFN is assigned to the UE 102, and thus when the UE 102 may expect a paging message. One such technique is specified by 3GPP LTE, and uses the IMSI number (IMSI), the DRX cycle length (T), and the number of subframes usable for paging in each frame (nB) in accordance with:

$$\text{PFN}=(T \text{ div } N)*((\text{IMSI mod range(SFN)}) \text{mod } N), \text{ and} \qquad (1)$$

$$N=\min(T,nB), \qquad (2)$$

where IMSI is in decimal format, range(SFN) represents the range of possible SFN values (for a 10-bit SFN, range(SFN)=1024), and nB may be specified in an SIB and selected from a group (e.g., 4T, 2T, T, T/2, T/4, T/8, T/16, or T/32). Any other technique for assigning a PFN to user equipment may be used to determine the PFN.

In addition to using an ASFN to determine when to monitor for paging occasions, some embodiments of the paging circuitry 204 may wait for other signals prior to monitoring for paging occasions. For example, in some embodiments, the paging circuitry 204 may wait for a wake-up indicator from the eNB 110, and may monitor for paging occasions in response to identifying such a wake-up indicator. In some embodiments, the paging circuitry 204 may include an inactivity period timer, and may monitor for paging occasions in response to an indicator from the inactivity period timer indicating that a predetermined period of inactivity has elapsed.

In embodiments in which the UE is configured for an MTC application, the UE 102 may include MTC data circuitry 206. The MTC data circuitry 206 may be any circuitry associated with the MTC application to be performed by the UE 102 (e.g., sensors, processors, and memory devices). The MTC data circuitry 206 may obtain and store the MTC data to be transmitted to the MTC server 118 or other device.

The UE 102 may include transmitter circuitry 208. The antenna 210 may be coupled to the transmitter circuitry 208.

The transmitter circuitry 208 may be configured for transmitting wireless signals, via the antenna 210, to other devices, such as any of the devices discussed above with reference to FIG. 1. For example, the transmitter circuitry 208 may transmit wireless signals representative of MTC data to the MTC server 118 and/or other devices. Any data transmitted by the transmitter circuitry 208 may be stored in the memory 212, prior to transmission, temporarily or permanently.

In some embodiments, the transmitter circuitry 208 may be configured to transmit an indicator representative of a proposed DRX cycle length to the eNB 110. The eNB 110 may use this indicator in determining the extension data to be transmitted to the UE 102. In some embodiments, the transmitter circuitry 208 may transmit this indicator to the eNB 110 through an intermediary (e.g., by transmitting the indicator to the MME 116a for transmission from the MME 116a to the eNB 110). The resulting length of the DRX cycle may be equal to the length proposed by the UE 102, or otherwise determined based on the proposed length. For example, the length of the DRX cycle may be selected to be the minimum, maximum, average, or other combination of the DRX cycle lengths proposed by the UE 102 (and provided, for example, in the upper layers of the protocol stack) and a default DRX cycle length value (included, for example, in the system information transmitted in an SIB). In some embodiments, the eNB 110 may determine the length of the DRX cycle (e.g., using one of the selection techniques discussed above) after the MME 116a accepts the proposed DRX cycle length from the UE 102.

In some embodiments, the indicator of the proposed DRX cycle length may be a proposed number of extension bits (e.g., as discussed above with reference to Table 2) or a proposed multiplier factor (e.g., as discussed above with reference to Table 3). In some embodiments, the indicator of the proposed DRX cycle length may be a proposed DRX cycle length itself. The UE 102 and/or the eNB 110 may then determine the number of extension bits or the multiplier factor by which it is necessary to extend the SFN to achieve the proposed DRX cycle length. For example, if the extension data will include a multiplier factor, the UE 102 proposes an DRX cycle length of ExtendedDRXCycle, and the normal SFN is ten bits long, the UE 102 and/or the eNB 110 may calculate the required value of systemFrameNumberMult in accordance with:

$$\text{ExtendedDRXCycle div } 2^{10} = \text{floor}(\text{extendedDRXCycleFactor}). \quad (3)$$

In some embodiments, the indicator of the proposed DRX cycle length, transmitted by the UE 102, may include both a proposed DRX cycle length and a multiplier factor. In such embodiments, the eNB 110 need not calculate the multiplier factor. In some embodiments, an indicator of a proposed DRX cycle length may include information about proposed lengths for various other parameters associated with DRX, such as any of the additional parameters used in connected-mode DRX, as discussed above.

In some embodiments, the transmitter circuitry 208 may be configured to transmit an indicator of a proposed DRX cycle length in an NAS container to the MME 116a during different procedures, such as attach, tracking area update, or routing area update. In some such embodiments, after receiving the indicator from the UE 102, the MME 116a may transmit the indicator (or data related to the indicator) to the eNB 110 in an S1 or other paging message. In such embodiments, the default procedures of the eNB 110 used to determine the DRX cycle length (e.g., selecting the shorter of the default DRX cycle length and a cycle length specific to the UE 102) may be overridden. In some embodiments, the MME 116a may include logic that indicates to the eNB 110 and/or the UE 102 to ignore the cycle length proposed by the UE 102, or to adopt the cycle length proposed by the UE 102 (e.g., without performing any "minimum" or other selection technique, such as those discussed above).

Figure 3:
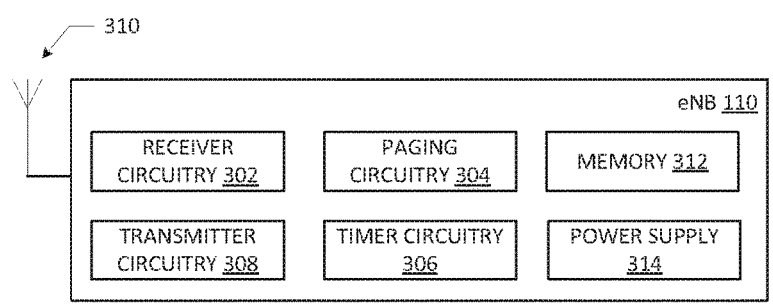
FIG. 3 is a block diagram of an illustrative eNB configured to support extended DRX cycles, in accordance with some embodiments.

Referring now to FIG. 3, a block diagram of an embodiment of the eNB 110 is illustrated, in accordance with some embodiments. As discussed above, the eNB 110 may be configured to support extended DRX cycles. Inn some embodiments, the eNB 110 may include or be included in a base station or other device. In some embodiments, the components of the eNB 110 discussed below may be included in a device other than an eNB, such as a server or node in the network 100. The various components of the eNB 110 may be configured to perform any of the eNB operations discussed above with reference to FIGS. 1 and 2. Any of the components of the eNB 110 may be electrically, physically and/or communicatively coupled together to perform the operations described herein.

The eNB 110 may include timer circuitry 306. The timer circuitry 306 may be configured to provide an SFN for transmission to the UE 102 when the UE 102 is in a cell served by the eNB 110. The SFN may be used by all UEs in the cell. In some embodiments, the timer circuitry 306 of the eNB 110 may generate the SFN. In some embodiments, the SFN may be provided to the eNB 110 by another device in the network 100, and received by the eNB 110 for retransmission to the UE 102.

The eNB 110 may include transmitter circuitry 308. The transmitter circuitry 308 may be configured to transmit the SFN to the UE 102 (as discussed above with reference to the receiver circuitry 202 of FIG. 2). In some embodiments, the SFN may be transmitted in an MIB, or in any of the ways described above with reference to the UE 102. The UE 102 may read the MIB and synchronize itself to the SFN, as discussed above.

The transmitter circuitry 308 may also be configured to transmit extension data to the UE 102 (as also discussed above with reference to the receiver circuitry 202 of FIG. 2). The extension data may be transmitted to the UE 102 in an MIB or an SIB, for example. In some embodiments, the transmitter circuitry 308 may be configured to transmit an indicator to the UE 102 to extend the DRX cycle length based on the extension data (e.g., as discussed above with reference to Table 1). The extension data transmitted from the eNB 110 via the transmitter circuitry 308 may take the form of any of the various types of extension data described above with reference to the UE 102 (e.g., the embodiments described above with reference to Tables 2-4). The transmitter circuitry 308 may be coupled to the antenna 310, which may be used for wireless transmission and which may take the form of any of the antennas described above with reference to antenna 210 (FIG. 2).

The eNB 110 may include paging circuitry 304. The paging circuitry 304 may be configured to transmit a paging message to user equipment (e.g., the UE 102) in its coverage cell. The paging circuitry 304 may be configured to identify a PFN and an ASFN for the UE 102. The ASFN may be based on the SFN and the extension data, and may be determined in accordance with any of the techniques discussed above with reference to the paging circuitry 204 of the UE 102. The paging circuitry 304 may be configured to determine when the PFN for the UE 102 is equal to the ASFN. If the PFN is equal to the SFN, and a paging message is queued for transmission to the UE 102, the paging circuitry 304 may provide the paging message for transmission (by the transmitter circuitry 308) to the UE 102. The paging circuitry 304 may be configured to determine the PFN for the UE 102 using the same technique that the UE 102 uses to determine the PFN, such as any of those discussed above with reference to Eqs. 1 and 2.

In some embodiments, the paging circuitry 304 may provide the paging message by coordinating the retransmission of a paging message, received by the receiver circuitry 302 of the eNB 110, to the UE 102 via the transmitter circuitry 308. In particular, the paging message may be transmitted to the eNB 110 by the MME 116a, and the paging circuitry 304 may provide the received paging message for transmission to all or some of the user equipment (e.g., the UE 102) in the coverage cell of the eNB 110. In some embodiments, the MME 116a may transmit the paging message to all eNBs in a particular tracking area, each of which may then retransmit the paging message as appropriate.

The paging circuitry 304 may further maintain and/or access different status variables, parameter values, and other data in a memory 312. The memory 312 may include any suitable memory device(s) and supporting circuitry, such as the memory devices discussed below with reference to FIG. 6. Status variables may represent information about the state of operation of the eNB 110 and/or any of the user equipment with which the eNB 110 is in communication (e.g., the UE 102). The paging circuitry 304 may maintain and/or access different parameter values in the memory 312 that correspond to DRX operations to be performed for different user equipment operating in various modes. For example, when the UE 102 is performing DRX operations while in connected mode, the paging circuitry 304 may access one or more connected mode DRX parameters stored in the memory 312 (such as any of the connected mode DRX parameters described above).

In addition to using an ASFN to determine when to transmit a paging message, some embodiments of the paging circuitry 304 may provide other signals for transmission to the UE 102 to trigger a transition of the UE 102 into a listening phase. As discussed above, for example, the paging circuitry 304 may provide an indicator for transmission to the UE 102, in response to which the UE 102 may enter a listening phase and begin monitoring for paging occasions.

The eNB may include receiver circuitry 302. The receiver circuitry 302 may be coupled to the antenna 310, which may be used for wireless reception and which may take the form of any of the antennas described above with reference to antenna 210 (FIG. 2). In some embodiments, the receiver circuitry 302 may receive the extension data from the MME 116a. The extension data may be transmitted from the MME 116a in an S1 paging message, or in some other form.

In some embodiments, the receiver circuitry 302 may be configured to receive an indicator, representative of a proposed DRX cycle length, from the UE 102. The extension data transmitted by the transmitter circuitry 308 to the UE 102 may be based on the indicator representative of the proposed DRX cycle length. In some embodiments, the paging circuitry 304 may be further configured to determine a maximum of the proposed DRX cycle length and a default DRX cycle length, and generate the PFN for the UE 102 based on the determined maximum. This embodiment is decidedly different from some existing techniques, which set the DRX cycle length equal to the minimum of the proposed DRX cycle length and a default DRX cycle length; for MTC applications, the proposal of the UE 102 for the DRX cycle length may be allowed to override the default length if the UE 102 proposes that fewer paging occasions are desirable.

The eNB 110 may include power supply circuitry 314. The power supply circuitry 314 may be coupled with any one or more components of the eNB 110, and may function in any of the ways described above with reference to the power supply circuitry 214 of the UE 102.

In some embodiments of the extended DRX techniques disclosed herein, the UE 102 may begin using an extended DRX cycle in response to a specific indication by the network 100 (e.g., through a MAC message, or a particular indicator transmitted by the eNB 110 to the UE 102). In some embodiments, the UE 102 may begin using an extended DRX cycle when no data transfer activity has occurred for a predetermined period of time. This period of time may be measured by an inactivity timer, as discussed above with respect to connected-mode DRX techniques, or by another timer (e.g., as defined as part of the information element discussed above with reference to Table 7).

In some embodiments of connected-mode DRX techniques, which may include long and short DRX cycles, the UE 102 may initially utilize a standard DRX technique (e.g., as currently defined in the 3GPP LTE specification). If no data transfer activity occurs for a first predetermined period of time, or no indicator is received from the eNB 110 or other device, the UE 102 may begin a short DRX cycle. If no data transfer activity occurs for a second predetermined period after beginning the short DRX cycle, the UE 102 may then begin a long DRX cycle. In embodiments in which no short DRX cycle is configured, the UE 102 may begin the long DRX cycle upon the expiration of the first predetermined period. After the long DRX cycle begins, the UE 102 may wait for a third predetermined period of time (a timer for which may be defined by the information element described above with reference to Table 7), and if there is still no data transfer activity, the UE 102 may begin an extended DRX cycle in accordance with any of the extended DRX techniques disclosed herein. The UE 102 may "wake up" and exit the extended DRX cycle if, for example, DL traffic is detected during any of the listening phases or UL traffic is sent (at any time or only during the listening phases).

Figure 4:
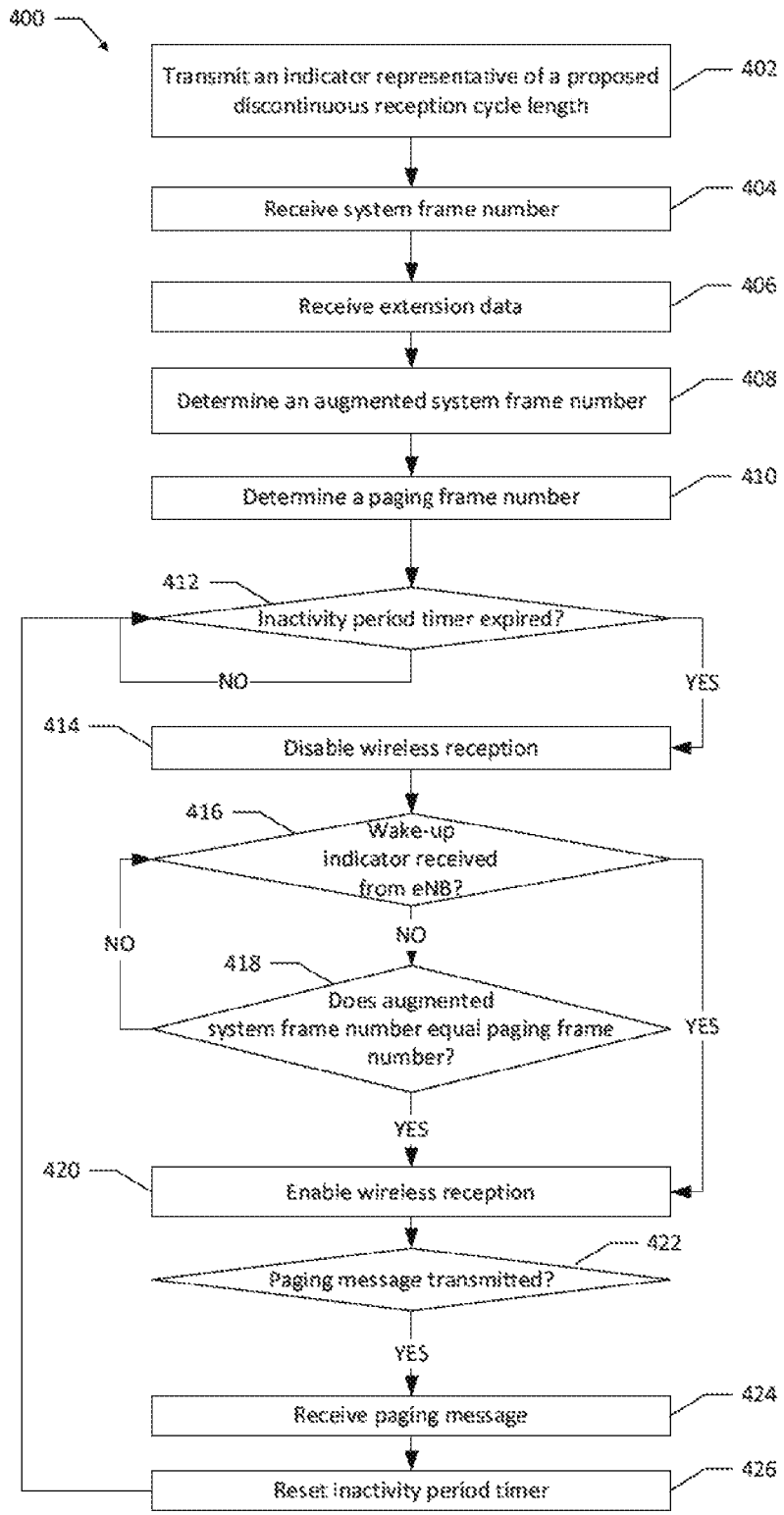
FIG. 4 is an example flow diagram illustrating a process for monitoring for paging occasions by a UE in an extended DRX cycle, in accordance with some embodiments.

Referring now to FIG. 4, a flow diagram of an example process 400 for monitoring for paging occasions by a UE in an extended DRX is illustrated, in accordance with various embodiments. It may be recognized that, while the operations of the process 400 (and the other processes described herein) are arranged in a particular order and illustrated once each, in various embodiments, one or more of the operations may be repeated, omitted or performed out of order. For illustrative purposes, operations of the process 400 may be described as performed by the UE 102 (in communication with the eNB 110), but the process 400 may be performed by any suitably configured device (e.g., a programmed processing system, an ASIC, or another wireless computing device). Various ones of the operations illustrated in FIG. 4 may be performed or not performed by a UE depending on whether the UE is in a connected mode or an idle mode, as appropriate.

The process 400 may begin at the operation 402, in which the UE 102 may transmit an indicator representative of a proposed DRX cycle length. The operation 402 may be executed by the transmitter circuitry 208, with data supplied by the paging circuitry 204. The indicator of the proposed DRX cycle length may take the form of any of the indicators described above. In some embodiments, the operation 402 may be optional, or not included.

At the operation 404, the UE 102 may receive an SFN. The SFN may be received by the receiver circuitry 202. The SFN may be transmitted to the UE 102 from an eNB (e.g., the eNB 110) or by another component of the network 100. In some embodiments, the SFN may be included in an MIB. The SFN may be stored in the memory 212 (e.g., by the receiver circuitry 202) for access by the paging circuitry 204.

At the operation 406, the UE 102 may receive extension data. The extension data may be received by the receiver circuitry 202. The extension data may be transmitted to the UE 102 by the eNB 110 or by another component of the network 100. The extension data may be stored (e.g., by the receiver circuitry 202) in the memory 212 for access by the paging circuitry 204.

At the operation 408, the UE 102 may determine an ASFN. The ASFN may be determined by the paging circuitry 204, and may be based on the SFN and extension data received at the operations 404 and 406 and stored in the memory 212. The determination of the ASFN may take the form of any of the ASFN determination techniques described above.

At the operation 410, the UE 102 may determine a PFN. The PFN may be determined by the paging circuitry 204. The determination of the PFN may take the form of any of the PFN determination techniques described above (e.g., the technique currently supported by 3GPP LTE).

At the decision block 412, the UE 102 (e.g., the paging circuitry 204) may determine whether an inactivity period timer has expired (e.g., by receiving an indicator from the inactivity period timer). An inactivity period timer may be utilized when the UE 102 is in a connected mode, for example. In some embodiments, the decision block 412 may be optional, or not performed. If the UE 102 determines at the decision block 412 that the inactivity period has expired (or if the decision block 412 is not performed), the UE 102 may proceed to the operation 414 and disable wireless reception. The operation 416 may be performed by the power supply circuitry 214 in conjunction with the receiver circuitry 202. The disabling of wireless reception at the operation 416 may correspond to the UE 102 entering into a DRX sleep phase. Disabling wireless reception, as discussed above, may preserve battery power in MTC and other applications.

If the UE 102 determines at the operation 412 that the inactivity period has not expired, the UE 102 may continue to monitor the inactivity timer, and may proceed to the decision block 416 when the inactivity period timer has expired.

At the decision block 416, the UE 102 may determine whether a wake-up indicator has been received from the eNB 110. The decision block 416 may be executed by the paging circuitry 204 in conjunction with the receiver circuitry 202. In some embodiments, the decision block 416 may be optional, or not performed.

If the UE 102 determines at the decision block 416 that a wake-up indicator has been received from the eNB 110 (or if the decision block 416 is not performed), the UE 102 may proceed to the decision block 418 and determine whether the ASFN (determined at the operation 408) is equal to the PFN (determined at the operation 410). The decision block 418 may be executed by the paging circuitry 204. If the UE 102 determines that the ASFN is not equal to the PFN, the UE 102 may return to the decision block 418.

If the UE 102 determines that the ASFN is equal to the PFN, the UE 102 may proceed to the operation 420 and enable wireless reception. The operation 420 may be performed by the power supply circuitry 214 in conjunction with the receiver circuitry 202.

At the decision block 422, the UE 102 may determine whether a paging message has been transmitted from the eNB 110 to the UE 102. The decision block 422 may be executed by the paging circuitry 204. If the UE 102 determines that a paging message has not been transmitted at the paging occasion, the UE 102 may return to the operation 412 and disable wireless reception.

If the UE determines that a paging message has been transmitted from the eNB 110 to the UE 102, the UE 102 may proceed to the operation 424 and receive the paging message from the eNB 110. The operation 424 may be performed by the receiver circuitry 202, and the paging message stored in the memory 212.

At the operation 426, the UE 102 may reset the inactivity period timer monitored at the decision block 412, and then may return to the operation 412 and disable wireless reception.

Figure 5:
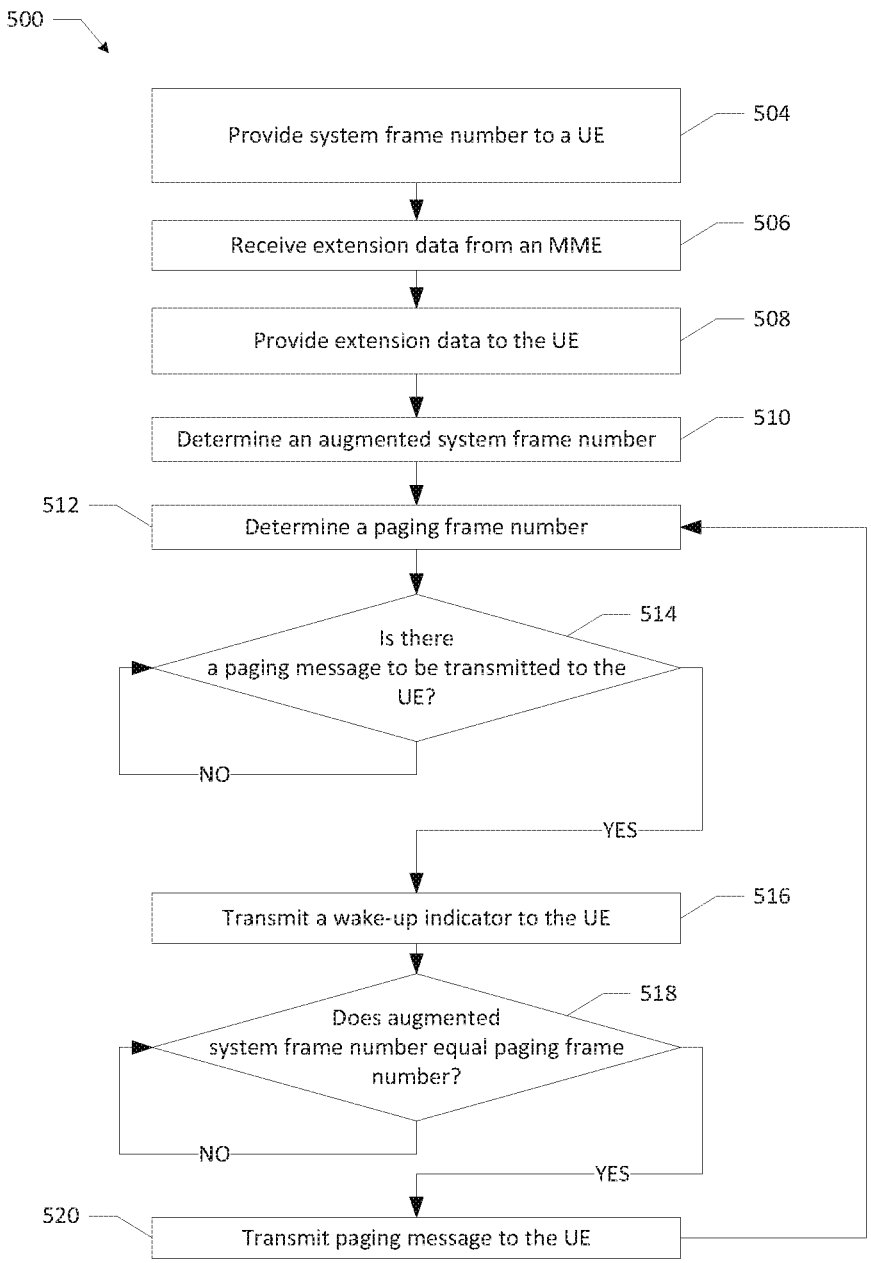
FIG. 5 is an example flow diagram illustrating a process for paging a UE in an extended DRX cycle, in accordance with some embodiments.

Referring now to FIG. 5, a flow diagram of an example process 500 for paging a UE in an extended DRX cycle is illustrated, in accordance with various embodiments. For illustrative purposes, the process 500 will be discussed as executed by the eNB 110 (in communication with the UE 102), but may be executed by any suitable device.

The process 500 may begin at the operation 504, in which the eNB 110 may provide an SFN for transmission to the UE 102. The operation 504 may be performed by the paging circuitry 304, and the SFN may be transmitted via the transmitter circuitry 308. The SFN may be stored in the memory 312.

At the operation 506, the eNB 110 may receive extension data from the MME 116a. The operation 506 may be performed by the receiver circuitry 302, and the extension data stored in the memory 312. In some embodiments, the operation 506 may be optional, or not included. For example, the extension data may be generated by the eNB 110.

At the operation 508, the eNB 110 may provide extension data for transmission to the UE 102. The operation 508 may be performed by the paging circuitry 304, and the extension data may be transmitted via the transmitter circuitry 308. The extension data provided at the operation 508 may take the form of any of the extension data described herein.

At the operation 510, the eNB 110 (e.g., the paging circuitry 304) may determine an ASFN. The operation 510 may be performed in accordance with any of the ASFN determination techniques disclosed herein.

At the operation 512, the eNB 110 (e.g., the paging circuitry 304) may determine a PFN. The operation 512 may be performed in accordance with any of the PFN determination techniques disclosed herein.

At the decision block 514, the eNB 110 (e.g., the paging circuitry 304) may determine whether there is a paging message to be transmitted to the UE 102. The paging circuitry 304 may access a paging message queue (stored, for example, in the memory 312) to determine whether there is a paging message for transmission. If the eNB 110 determines that there is no a paging message to be transmitted to the UE 102, the eNB 110 may wait until there is a paging message to be transmitted to the UE 102.

If the eNB 110 determines that the there is a paging message to be transmitted to the UE 102, the eNB 110 may proceed to the operation 516 and may provide a wake-up indicator for transmission to the UE 102. In some embodiments, the operation 506 may be optional, or not included.

At the decision block 518, the eNB 110 may determine whether the ASFN (determined at the operation 510) is equal to the PFN (determined at the operation 512). If the eNB 110 determines that the ASFN is not equal to the PFN, the eNB 110 may wait until the ASFN is equal to the PFN.

If the eNB 110 determines that the ASFN is equal to the PFN at the decision block 518, the eNB 110 may proceed to the operation 520 and transmit a paging message to the UE 102. The eNB 110 may then return to the operation 512 to determine a PFN, and then wait at the decision block 514 until there is another paging message to be transmitted to the UE 102.

Figure 6:
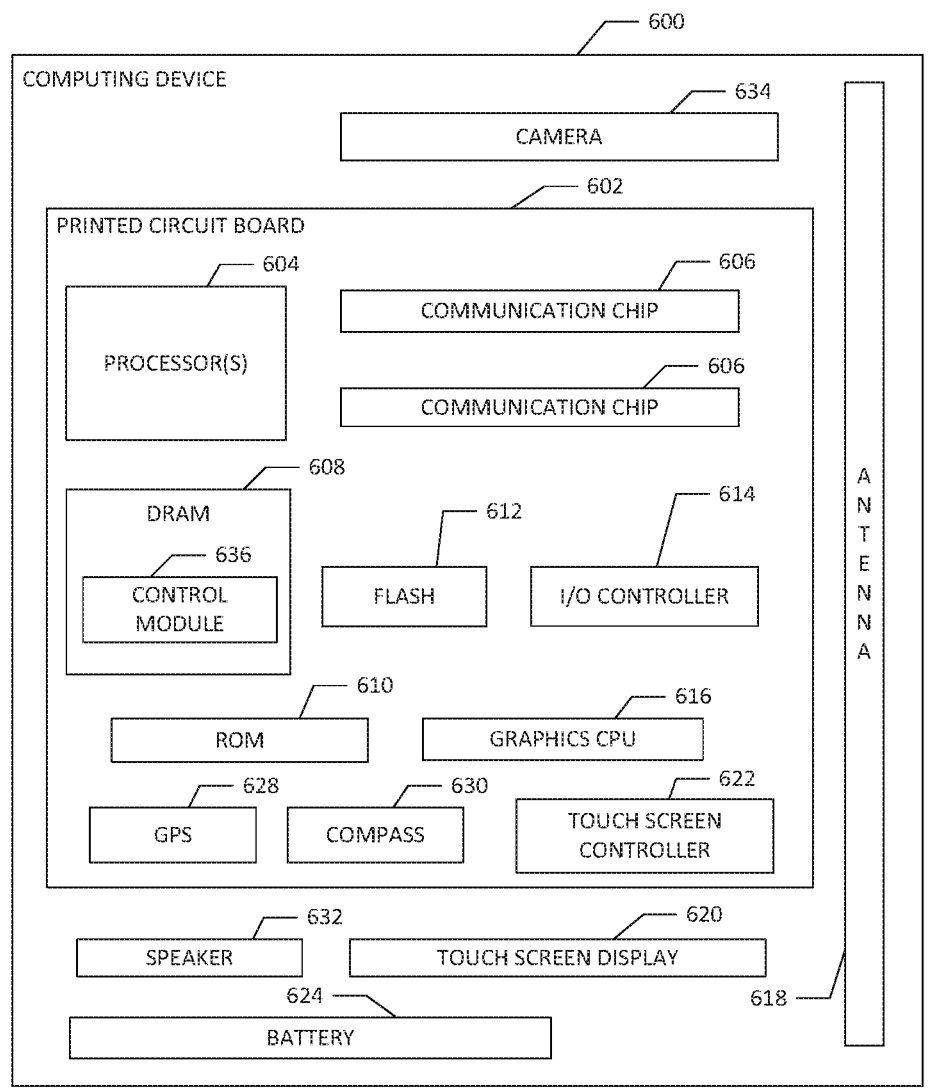
FIG. 6 is a block diagram of an example computing device that may be used to practice various embodiments described herein, in accordance with some embodiments.

FIG. 6 is a block diagram of an example computing device 600, which may be suitable for practicing various disclosed embodiments. For example, the computing device 600 may serve as the UE 102, the eNB 110, or any other suitable device discussed herein. The computing device 600 may include a number of components, including one or more processor(s) 604 and at least one communication chip 606. In various embodiments, the processor 604 may include a processor core. In various embodiments, at least one communication chip 606 may also be physically and electrically coupled to the processor 604. In further implementations, the communication chip 606 may be part of the processor 604. In various embodiments, the computing device 600 may include a PCB 602. For these embodiments, the processor 604 and the communication chip 606 may be disposed thereon. In alternate embodiments, the various components may be coupled without the employment of the PCB 602.

Depending on its applications (e.g., MTC applications), the computing device 600 may include other components that may or may not be physically and electrically coupled to the PCB 602. These other components include, but are not limited to, volatile memory (e.g., dynamic random access memory 608, also referred to as DRAM), non-volatile memory (e.g., read-only memory 610, also referred to as "ROM," one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other displays (such as liquid-crystal displays, cathode-ray tube displays and e-ink displays, not shown), battery 624, an audio codec (not shown), a video codec (not shown), global positioning system (GPS) device 628, compass 630, an accelerometer (not shown), a gyroscope (not shown), speaker 632, camera 634, and a mass storage device (such as hard disk drive, a solid state drive, compact disk (CD), digital versatile disk (DVD)) (not shown), any other desired sensors (not shown) and so forth. In various embodiments, the processor 604 may be integrated on the same die with other components to form a System on Chip (SoC). Any components included in the computing device 600 (e.g., sensors) may be used in various MTC applications (e.g., by inclusion in the MTC data circuitry 206 of FIG. 2).

In various embodiments, volatile memory (e.g., DRAM 608), non-volatile memory (e.g., ROM 610), flash memory 612, and the mass storage device may include programming instructions configured to enable the computing device 600, in response to execution by the processor(s) 604, to practice all or selected aspects of the processes described herein. For example, one or more of the memory components such as volatile memory (e.g., DRAM 608), non-volatile memory (e.g., ROM 610), flash memory 612, and the mass storage device may include temporal and/or persistent copies of instructions that, when executed, enable computing device 600 to operate control module 636 configured to practice all or selected aspects of the processes described herein. Memory accessible to the computing device 600 may include one or more storage resources that are physically part of a device on which the computing device 600 is installed and/or one or more storage resources that is accessible by, but not necessarily a part of, the computing device 600. For example, a storage resource may be accessed by the computing device 600 over a network via the communications chip 606.

The communication chip 606 may enable wired and/or wireless communications for the transfer of data to and from the computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, communication chips 606 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

As discussed above with reference to the UE 102, in various implementations, the computing device 600 may be a laptop, a netbook, a notebook, an ultrabook, a smart phone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

The following paragraphs describe examples of various embodiments. Example 1 is a user equipment including receiver circuitry and paging circuitry. The receiver circuitry is to receive a system frame number from an eNB, and receive extension data from the eNB. The paging circuitry is to determine an augmented system frame number based on the system frame number and the extension data, determine a paging frame number based on the extension data; and monitor for paging occasions when the augmented system frame number is equal to the paging frame number.

Example 2 may include the subject matter of Example 1, and may further specify that receive extension data from the eNB comprises receive extension data from the eNB in an information element of a master information block or a system information block.

Example 3 may include the subject matter of any of Examples 1 and 2, and may further specify that the system frame number comprises a fixed number of bits, the extension data comprises one or more bits, and determine an augmented system frame number based on the system frame number and the extension data comprises concatenate the system frame number and the extension data into a single bit string representative of the augmented system frame number.

Example 4 may include the subject matter of any of Examples 1-3, and may further specify that the extension data comprises a multiplier factor, and determine an augmented system frame number based on the system frame number and the extension data comprises multiplication of the system frame number and the multiplier factor to generate the augmented system frame number.

Example 5 may include the subject matter of any of Examples 1-4, and may further include transmitter circuitry to transmit an indicator representative of a proposed discontinuous reception cycle length to the eNB for use in determining the extension data.

Example 6 may include the subject matter of Example 5, and may further specify that transmit the indicator representative of the proposed discontinuous reception cycle length to the eNB comprises transmit the indicator representative of the proposed discontinuous reception cycle length to a mobility management entity for transmission from the mobility management entity to the eNB.

Example 7 may include the subject matter of any of Examples 1-6, and may further specify that the paging circuitry is to monitor for paging occasions when the user equipment is in a connected mode, the extension data comprises a multiplier factor; and the paging circuitry is further to modify a connected mode discontinuous reception parameter by the multiplier factor, wherein the connected mode discontinuous reception parameter comprises an on duration timer parameter, an inactivity timer parameter, a retransmission timer parameter, a long cycle start offset parameter, or a short cycle timer parameter.

Example 8 may include the subject matter of any of Examples 1-7, and may further specify that the paging circuitry is to, prior to monitoring for paging occasions when the augmented system frame number is equal to the paging frame number, wait for a wake-up indicator from the eNB or from an inactivity period timer; wherein the paging circuitry monitors for paging occasions in response to receiving the indicator.

Example 9 is an eNB comprising timer circuitry, transmitter circuitry and paging circuitry. The timer circuitry is to provide a system frame number for transmission to a user equipment in a cell served by the eNB. The transmitter circuitry is to transmit the system frame number to the user equipment, and transmit extension data to the user equipment. The paging circuitry is to determine when a paging frame number for the user equipment is equal to an augmented system frame number, the augmented system frame number based on the system frame number and the extension data; and if the paging frame number is equal to an augmented system frame number, and a paging message is queued for transmission to the user equipment, provide the paging message for transmission to the user equipment.

Example 10 may include the subject matter of Example 9, and may further include receiver circuitry to receive an indicator representative of a proposed discontinuous reception cycle length from the user equipment, wherein the extension data is based on the indicator representative of the proposed discontinuous reception cycle length.

Example 11 may include the subject matter of Example 10, and may further specify that the paging circuitry is to determine a maximum of the proposed discontinuous reception cycle length and a default discontinuous reception cycle length, and generate the paging frame number for the user equipment based on the determined maximum.

Example 12 may include the subject matter of any of Examples 10-11, and may further specify that the paging circuitry is to generate the paging frame number for the user equipment based on the proposed discontinuous reception cycle length.

Example 13 may include the subject matter of any of Examples 9-12, and may further specify that the transmitter circuitry is to transmit the extension data to the user equipment in a master information block or a system information block.

Example 14 may include the subject matter of any of Examples 9-13, and may further include receiver circuitry to receive the extension data from a mobile management entity.

Example 15 may include the subject matter of Example 14, and may further specify that the receiver circuitry is to receive the extension data from the mobile management entity in an S1 paging message.

Example 16 may include the subject matter of any of Examples 9-15, and may further specify that the transmitter circuitry is to transmit an indicator to the user equipment to extend a discontinuous reception cycle length based on the extension data.

Example 17 is one or more computer readable media having computer readable instructions stored therein which, when executed by one or more processing devices of a user equipment, cause the user equipment to: receive a system frame number from an eNB; receive extension data from the eNB; determine an augmented system frame number based on the system frame number and the extension data; determine a paging frame number based on the extension data; and monitor for paging occasions when the augmented system frame number is equal to the paging frame number.

Example 18 may include the subject matter of Example 17, and may further include computer readable instructions stored therein which, when executed by the one or more processing devices of the user equipment, cause the user equipment to, when not monitoring for paging occasions, disable wireless reception.

Example 19 may include the subject matter of any of Examples 17-18, and may further specify that receive extension data from the eNB comprises receive extension data from the eNB in an information element of a master information block or a system information block.

Example 20 may include the subject matter of any of Examples 17-19, and may further specify that the system frame number comprises a fixed number of bits; the extension data comprises one or more bits; and determine an augmented system frame number based on the system frame number and the extension data comprises concatenate the system frame number and the extension data into a single bit string representative of the augmented system frame number.

Example 21 may include the subject matter of any of Examples 17-20, and may further specify that the extension data comprises a multiplier factor; and determine an augmented system frame number based on the system frame number and the extension data comprises multiply the system frame number and the multiplier factor to generate the augmented system frame number.

Example 22 may include the subject matter of any of Examples 17-21, and may further include computer readable instructions stored therein which, when executed by the one or more processing devices of the user equipment, cause the user equipment to transmit a wake-up indicator representative of a proposed discontinuous reception cycle length to the eNB for use in determining the extension data.

Example 23 may include the subject matter of Example 22, and may further specify that transmit the indicator representative of the proposed discontinuous reception cycle length to the eNB comprises transmit the indicator representative of the proposed discontinuous reception cycle length to a mobility management entity for transmission from the mobility management entity to the eNB.

Example 24 may include the subject matter of any of Examples 17-23, and may further specify that the user equipment monitors for paging occasions when the user equipment is in a connected mode, the extension data comprises a multiplier factor, and the one or more computer readable media further has computer readable instructions stored therein which, when executed by the one or more processing devices of the user equipment, cause the user equipment to modify a connected mode discontinuous reception parameter by the multiplier factor, wherein the connected mode discontinuous reception parameter comprises an on duration timer parameter, an inactivity timer parameter, a retransmission timer parameter, a long cycle start offset parameter, or a short cycle timer parameter.

Example 25 may include the subject matter of any of Examples 17-24, and may further include computer readable instructions stored therein which, when executed by the processing device of the user equipment, cause the user equipment to, prior to monitoring for paging occasions when the augmented system frame number is equal to the paging frame number, wait for a wake-up indicator from the eNB or from an inactivity period timer, wherein the user equipment monitors for paging occasions in response to receiving the indicator.

Example 26 is one or more computer readable media having instructions thereon that, when executed by one or more processing devices of a computing device, cause the computing device to perform the method of any of Examples 1-8.

Example 27 is an apparatus including means for performing the method of any of Examples 1-8.

Example 28 is a system including: one or more processing devices; and one or more computer readable media having instructions thereon that, when executed by the one or more processing devices, cause the apparatus to perform the method of any of Examples 1-8.

What is claimed is:

1. One or more non-transitory, computer-readable media having instructions that, when executed, cause a user equipment to:
determine a factor included in a transmission from an evolved node B;
multiply each of a plurality of discontinuous reception ("DRX") parameters by the factor to obtain a corresponding plurality of modified DRX parameters, wherein the plurality of DRX parameters includes an on duration timer, a DRX inactivity timer, a DRX retransmission timer, a long DRX cycle start offset, a short DRX cycle, and a DRX short cycle timer; and
perform a DRX operation based on the plurality of modified DRX parameters.

2. The one or more non-transitory, computer-readable media of claim 1, wherein the factor is an integer received in DRX configuration information.

3. The one or more non-transitory, computer-readable media of claim 1, wherein the instructions, when executed, further cause the user equipment to:
wait a predetermined period after a long DRX cycle is started before performing the DRX operation based on the plurality of modified DRX parameters.

4. The one or more non-transitory, computer-readable media of claim 3, wherein the instructions, when executed, further cause the user equipment to:
determine the predetermined period based on a timer value provided in DRX configuration information.

5. A user equipment comprising:
receiver circuitry to receive a discontinuous reception ("DRX") configuration message; and
paging circuitry to:
determine a factor based on the DRX configuration message;
multiply each of a plurality of DRX parameters by the factor to obtain a corresponding plurality of modified DRX parameters, wherein the plurality of modified DRX parameters includes an on duration timer, a DRX inactivity timer, a DRX retransmission timer, a long DRX cycle start offset, a short DRX cycle, and a DRX short cycle timer; and
perform a DRX operation based on the plurality of modified DRX parameters.

6. The user equipment of claim 5, wherein the factor is an integer received in the DRX configuration message.

7. The user equipment of claim 5, wherein the paging circuitry is further to:
wait a predetermined period after a long DRX cycle is started before performing the DRX operation based on the plurality of modified DRX parameters.

8. The user equipment of claim 7, wherein the paging circuitry is further to:
determine the predetermined period based on a timer value provided in DRX configuration information.

9. One or more non-transitory, computer-readable media having instructions that, when executed, cause a device to:
transmit a configuration message that includes a factor to a user equipment ("UE");
multiply each of a plurality of discontinuous reception ("DRX") parameters by the factor to obtain a corresponding plurality of modified DRX parameters, wherein the plurality of modified DRX parameters includes an on duration timer, a DRX inactivity timer, a DRX retransmission timer, a long DRX cycle start offset, a short DRX cycle, and a DRX short cycle timer; and
transmit a paging message to the UE based on the plurality of modified DRX parameters.

10. The one or more non-transitory, computer-readable media of claim 9, wherein the factor is transmitted as an integer in DRX configuration information.

11. The one or more non-transitory, computer-readable media of claim 9, wherein the instructions, when executed, further cause the device to:
configure the UE with a timer value to indicate a predetermined period for the UE to wait after a long DRX cycle is started before performing a DRX operation.

* * * * *